(12) United States Patent
Zhou et al.

(10) Patent No.: US 8,928,658 B2
(45) Date of Patent: Jan. 6, 2015

(54) PHOTON MAPPING ON GRAPHICS HARDWARE USING KD-TREES

(75) Inventors: Kun Zhou, Beijing (CN); Hou Qiming, Beijing (CN); Baining Guo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1060 days.

(21) Appl. No.: 12/241,046

(22) Filed: Sep. 30, 2008

(65) Prior Publication Data

US 2010/0079452 A1    Apr. 1, 2010

(51) Int. Cl.
*G06F 15/00* (2006.01)
*G06T 17/00* (2006.01)
*G06F 3/048* (2013.01)
*G06T 15/50* (2011.01)

(52) U.S. Cl.
CPC .............. *G06T 17/005* (2013.01); *G06F 3/048* (2013.01); *G06T 15/50* (2013.01)
USPC ............ 345/420; 345/422; 345/426; 345/427

(58) Field of Classification Search
CPC ...................................................... G06F 3/048
USPC ........................... 345/420, 422, 423, 426, 427
See application file for complete search history.

(56) References Cited

U.S. PATENT DOCUMENTS

| 7,221,365 | B1 | 5/2007 | Levesque et al. | |
|---|---|---|---|---|
| 7,236,171 | B2 | 6/2007 | Keller | |
| 7,327,365 | B2 | 2/2008 | Chen et al. | |
| 7,548,238 | B2 * | 6/2009 | Berteig et al. | 345/426 |
| 7,659,894 | B2 * | 2/2010 | Keller et al. | 345/426 |
| 2006/0066616 | A1 | 3/2006 | Sevastianov et al. | |
| 2007/0046686 | A1 | 3/2007 | Keller | |

OTHER PUBLICATIONS

Shevtsov et al "Highly Parallel Fast KD-tree Construction for Interactive Ray Tracing of Dynamic Scenes" Eurographics 2007; vol. 26 (2007), No. 3, pp. 395-404.*
Singh et al, The Photon Pipeline Resivited: A Hardware Architecture to Accelerate Photon mapping, Vision Computing, 2007, pp. 1-13.*
Foley et al, KD-tree Acceleration Structures for a GPU Raytracer, Graphics Hardware 2005, pp. 1-8.*
Horn et al, Interactive k-D Tree GPU Raytracing, Proceedings of the 2007 symposium on Interactive 3D graphics and games (2007), ACM Press, pp. 167-174.*

(Continued)

*Primary Examiner* — Phu K Nguyen
(74) *Attorney, Agent, or Firm* — Dan Choi; Peter Taylor; Micky Minhas

(57) ABSTRACT

Described is a technology by which a GPU-based photon mapping mechanism/algorithm uses a kd-tree to render arbitrary dynamic scenes. For each frame, the mechanism emits and traces a set of photons into the scene. When a photon hits a surface, it can either be reflected, transmitted, or absorbed based on the surface material. Once photon tracing is done, a kd-tree is built for the stored photons. To estimate the radiance value at an arbitrary surface point, the k-nearest photons are located and filtered. The photon tracing and photon kd-tree construction, as well as the radiance estimation using k-nearest neighbor (KNN) searches are performed on graphics hardware, e.g., a GPU. In one example, only caustic photons are traced, whereby a photon is terminated and stored once it hits a diffuse surface.

12 Claims, 10 Drawing Sheets

(56) References Cited

OTHER PUBLICATIONS

Popov et al, Stackless KD-tree Traversal for High Performance GPU Ray Tracing, EuroGraphics 2007, pp. 415-424.*
Popov et al, Experiences with Streaming Construction of SAH KD-Trees, 2006, pp. 1-6.*
Wald et al, Balancing Considered Harmful—Faster Photon Mapping using the Voxel Volume Heiristic, Eurographics 2004, pp. 1-9, 2004.*
Czuczor, et al., "Photon Map Gathering on the GPU†", Eurographics 2005, Short Presentations, Date: 2005, 4 Pages.
Jensen, Henrik Wann, "Global Illumination Using Photon Maps", Extended version of the paper in Rendering Techniques '96 (Proceedings of the Seventh Eurographics Workshop on Rendering, pp. 21-30, 1996), pp. 1-17.
Gunther, et al.,, et al., "Realtime Caustics Using Distributed Photon Mapping", Rendering Techniques 2004: Eurographics Symposium on Rendering, Date: 2004, 12 Pages.
Larsen, et al., "Simulating Photon Mapping for Real-time Applications", Eurographics Symposium on Rendering (2004), Date: 2004, 10 Pages.
Purcell, et al., "Photon Mapping on Programmable Graphics Hardware", Proceedings of the ACM SIGGRAPH/Eurographics conference on Graphics hardware, Year of Publication: 2003, pp. 41-50.
Brooks, D. Narayan, "Fast Rendering of Caustics Using Photon Mapping and Texture Maps", Jun. 4, 2002, http://www.soe.ucsc.edu/classes/cmps260/Spring02/submit/dbrooks/causticWeb/.
Cammarano, et al., "Time Dependent Photon Mapping", Thirteenth Eurographics Workshop on Rendering (2002), Date: 2002, 10 Pages.

\* cited by examiner

PHOTON MAPPING ON GRAPHICS HARDWARE USING KD-TREES

CROSS-REFERENCE TO RELATED APPLICATIONS

The present application is related to copending U.S. patent application Ser. Nos. 12/241,045 and 12/241,044, hereby incorporated by reference.

BACKGROUND

A kd-tree (short for k-dimensional tree) is a well-known space-partitioning data structure for organizing points in k-dimensional space. As an acceleration structure, kd-trees have been used in a variety of graphics applications.

Because of its significant usage in graphics, fast kd-tree construction has been a subject of much interest in recent years, with several CPU-based algorithms proposed and/or implemented. With a kd-tree, for example, a dynamic scene can be rendered, including by photon mapping, in which rays from a light source and a camera are traced until they terminate, at which time they are combined to produce radiance values. Photon mapping is useful in commercial modeling and rendering software, but is computationally slow and thus not very practical in an interactive model to dynamically render frequently changing scenes.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which photon mapping is performed on graphics hardware, such as to provide rapid photon mapping to interactively produce arbitrary, dynamic scenes. For each frame, a mechanism emits and traces a set of photons into the scene. Once photon tracing is done, a kd-tree is built for the stored photons.

In one aspect, to estimate the radiance value at an arbitrary surface point, the k-nearest photons are located and filtered. A search radius may be determined by constructing a histogram via a fixed-radius range search, reducing the search radius based upon the histogram, and iteratively repeating the constructing and reducing operations until an iteration number is met. In one implementation, only caustic photons that hit a diffuse surface are stored.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a mechanism comprising a photon mapping algorithm for arbitrary dynamic scenes. For each frame, the mechanism emits and traces a set of photons into the scene. When a photon hits a surface, it can either be reflected, transmitted, or absorbed based on the surface material. Once photon tracing is done, a kd-tree is built for the stored photons. To estimate the radiance value at an arbitrary surface point, the k-nearest photons are located and filtered. The photon tracing and photon kd-tree construction, as well as the radiance estimation using k-nearest neighbor (KNN) searches are performed on graphics hardware, e.g., a GPU.

As a sample application of the photon kd-tree and a KNN search, there is described a caustics rendering technique on the GPU. In this example, only caustic photons are traced, whereby a photon is terminated and stored once it hits a diffuse surface. Caustics are rendered by tracing eye rays. For each ray, at its first intersection with a diffuse surface, a KNN search is performed to locate the nearest photons, which are then filtered to get the radiance value.

Some of the examples herein describe an implementation of a kd-tree builder based on NVIDIA Corporation's CUDA framework. CUDA provides a general-purpose C language interface for GPU programming, and also exposes hardware features which are useful for data-parallel computations. For example, it allows arbitrary gather and scatter memory access from GPU programs, as generally mentioned herein. For example, during kd-tree construction, some of the data is stored as dynamic lists in linear device memory allocated via CUDA; list size is doubled whenever more memory is required. This allows avoiding overhead in CUDA memory management after an initial run, at the cost of more memory consumption. For structures with many fields such as nodes and triangles, structure of arrays (SoA) instead of array of structures (AoS) are used for more optimal GPU cache performance. Further, parallel primitives such as reduce and scan are called in the example implementation, which are implemented.

Notwithstanding, it is understood that these are only examples, and the technology described herein may be implemented in other environments. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and graphics processor computations in general.

Figure 1:
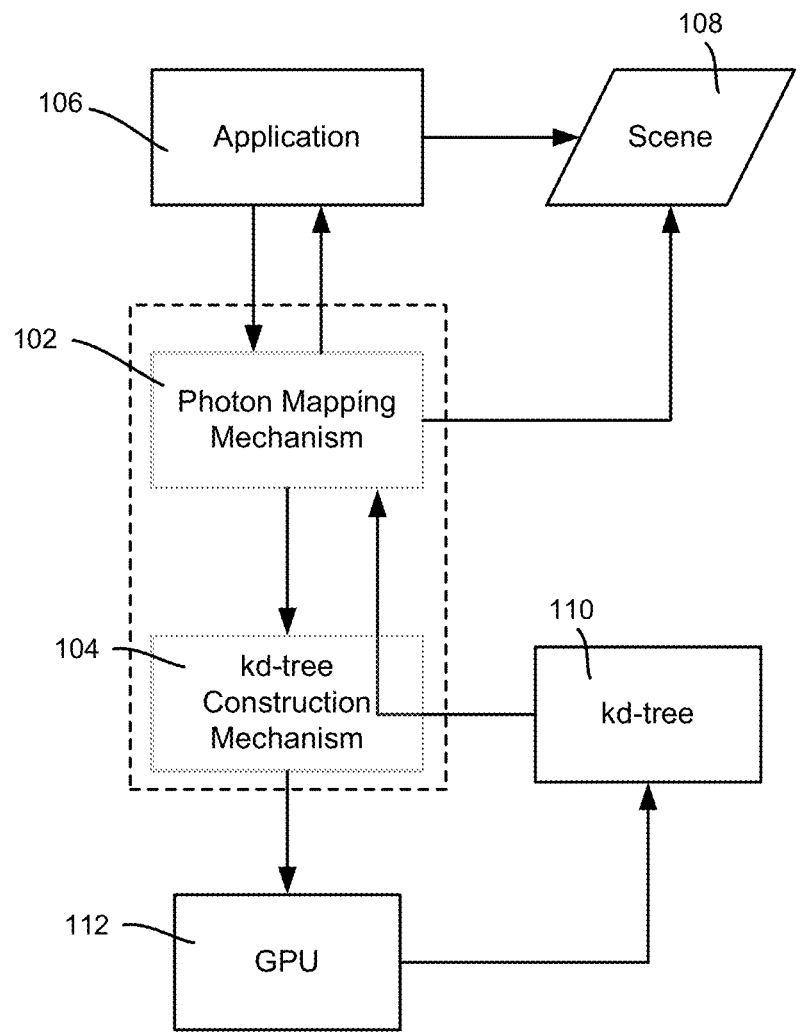
FIG. 1 is a block diagram representing example components of a kd-tree construction mechanism (builder) that builds kd-trees via graphics processing hardware.

Turning to FIG. 1, there is shown a general block diagram showing how a photon mapping mechanism 102 may work with an incorporated kd-tree construction mechanism 104, such as for use by an application 106 (which may be an operating system component) to dynamically render a scene 108. In general, the application 106 calls an API or the like (e.g., with supplied parameters) to work with the photon mapping mechanism 102, which uses the kd-tree construction mechanism to build a kd-tree 110 to represent photons. Alternatively, the photon mapping mechanism 102 may be incorporated into the application 106. The kd-tree construction mechanism 102 provides code and data for execution in the GPU 112, which executes the code to build the kd-tree 110.

In designing the kd-tree mechanism 104 (e.g., the algorithm set) for the GPU 112, the GPU's streaming architecture is leveraged when parallelizing kd-tree construction. Contemporary GPUs are substantially parallel, typically requiring over one-hundred threads for optimal performance. By following breadth-first search order, at each breadth-first search step, every node at the same tree level spawns a new thread and the total number of threads doubles from the preceding step.

To maintain kd-tree quality, schemes for fast evaluation of node split costs are provided, e.g., the efficient calculation of node split costs, such as the surface area heuristic (SAH) and voxel volume heuristic (VVH) costs are considered. Voxel volume heuristic (VVH) costs are used in building the tree for photon mapping, as described below. The standard practice of precisely evaluating the costs for the tree nodes is prohibitively expensive for real-time techniques. To address this issue, different schemes for the so-called "large" and "small" nodes are described herein, wherein a node is deemed as large if the number of triangles in the node is greater than a user-specified threshold otherwise it is small (e.g., one such threshold for large/small node is set as T=64). As described below, for large nodes at upper tree levels, two heuristics are used to estimate the costs, namely median splitting and "empty space maximizing." For small nodes near the bottom of the tree, where exact evaluation of the costs is necessary, a data structure is provided for storing the geometry primitives in these nodes as bitmasks, which allows efficiently evaluation of the exact costs, as well as sorting these primitives using bitwise operations.

Figure 2:
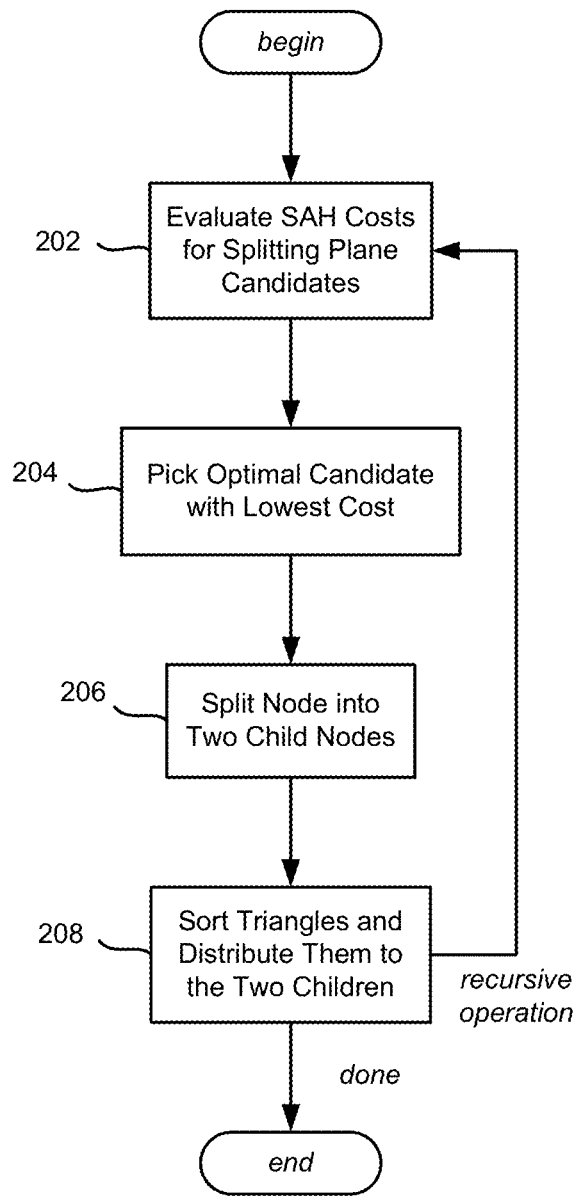
FIG. 2 is a flow diagram representing general steps of the kd-tree construction mechanism.

By way of one example of GPU-based kd-tree construction, an example of building SAH kd-trees, such as for ray tracing on the GPU, is described. The adaption of the algorithm to other kinds of kd-trees is straightforward. As with conventional kd-tree construction algorithms, the technique described herein builds a kd-tree in a greedy, top-down manner by recursively splitting the current node into two sub-nodes as in FIG. 2. Step 202 evaluates the SAH costs for splitting plane candidates, followed by step 204 which picks the optimal candidate with the lowest cost. The node is then split into two child nodes at step 206. Step 208 sorts triangles and distributes them to the two children.

The SAH cost function is defined as:

$$SAH(x) = C_{ts} + \frac{C_L(x)A_L(x)}{A} + \frac{C_R(x)A_R(x)}{A},$$

where $C_{ts}$ is the constant cost of traversing the node itself, $C_L(x)$ is the cost of the left child given a split position x, and $C_R(X)$ is the cost of the right child given the same split. $A_L(x)$ and $A_R(x)$ are the surface areas of the left and right child respectively, and A is the surface area of the node. Note that $C_L(x)$ and $C_R(x)$ can only be evaluated after the entire sub-tree has been built. Instead of seeking a globally optimal solution, existing algorithms use a locally greedy approximation by assuming the children are leaf nodes. In this case $C_L(x)$ and $C_R(x)$ equal the number of elements contained in the left and right child respectively.

Figure 3:
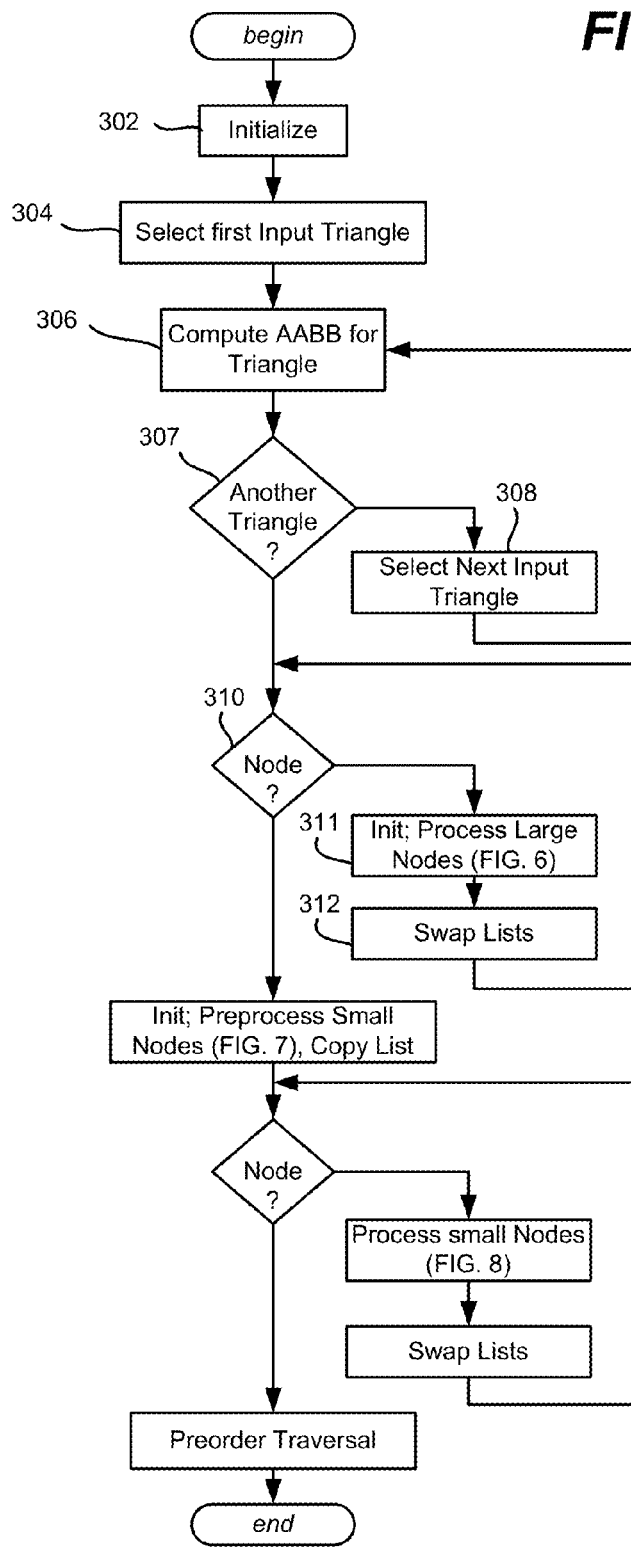
FIG. 3 is a flow diagram representing general steps of an algorithm for kd-tree construction.

The algorithm takes triangles as input and follows the construction pipeline as shown in FIG. 3 and set forth below:
Algorithm 1, Kd-Tree Construction:

```
// initialization stage
nodelist ← new list
activelist ← new list
smalllist ← new list
nextlist ← new list
Create rootnode
activelist.add(rootnode)
for each input triangle t in parallel
    Compute AABB for triangle t
// large node stage
while not activelist.empty( )
    nodelist.append(activelist)
    nextlist.clear( )
    PROCESSLARGENODES(activelist, smalllist, nextlist)
    Swap nextlist and activelist
// small node stage
PREPROCESSSMALLNODES(smalllist)
activelist ← smalllist
while not activelist.empty( )
    nodelist.append(activelist)
    nextlist.clear( )
    PROCESSSMALLNODES(activelist, nextlist)
    Swap nextlist and activelist
// kd-tree output stage
PREORDERTRAVERSAL(nodelist)
```

After an initialization step (step 302), the algorithm builds the tree in a breadth-first search manner, for both large nodes and small nodes. Then, the nodes of the tree are reorganized and stored. The pipeline comprises a set of stream processing steps together with some coordination work. The streaming steps are done on the GPU, while coordination work is done on the CPU (at relatively negligible costs).

In the initialization stage (step 302), global memories are allocated for tree construction and the root node is created. Additionally, at step 306 streaming step is performed to compute the axis-aligned bounding box (AABB) for each input triangle (in parallel, via steps 304, 307 and 308). In one current implementation, the user-specified threshold for large/small node is set as T=64.

Figure 4:
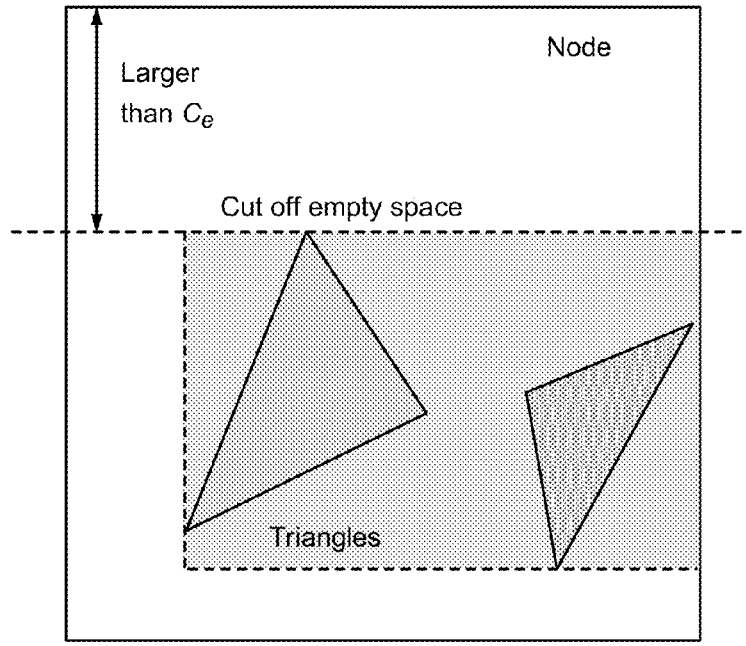
FIGS. 4 and 5 are example representations of splitting a large node, including by cutting off empty space (FIG. 4) and by a spatial median split (FIG. 5).
Figure 5:
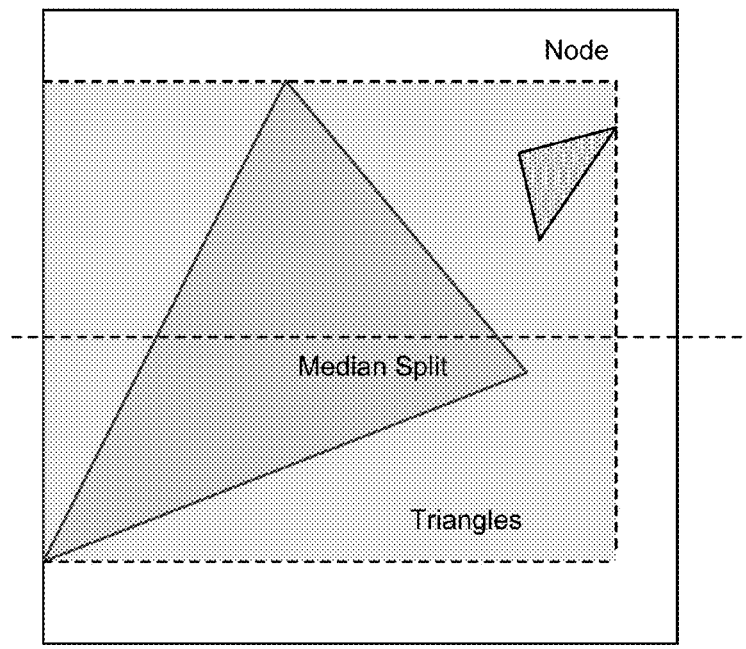

As mentioned above, the SAH evaluation in a conventional greedy optimization algorithm assumes that the current split produces two leaf nodes. For large nodes, this assumption is almost always untrue, whereby the resulting estimation is far from accurate. The splitting scheme described herein for large nodes is a combination of spatial median splitting and "empty space maximizing," which is effective for the upper levels of the tree. More particularly, if the empty space contained in the current node is larger than a predefined ratio $C_e$ along one axis, the empty space is cut off in the next split, as generally represented in FIG. 4; otherwise, the split plane is chosen at the spatial median of the node's longest axis split, as generally represented in FIG. 5. One current implementation takes $C_e$ equal to twenty five percent. Note that to apply this splitting scheme, a tight bounding box of the triangles contained in the node is computed.

Described herein is a strategy for large nodes at upper tree levels so as to further leverage the large scale parallelism of GPUs. For these nodes, the mechanism parallelizes the computation over geometric primitives instead of nodes at each level. This strategy is effective because there are only a relatively small number of large nodes at the upper levels, especially near the top of the tree, (which makes parallelizing over nodes inefficient and leaves the massive parallelism of GPUs underexploited). Moreover, the workload among threads is likely to be unbalanced because the number of primitives may vary significantly from node to node.

Figure 6:
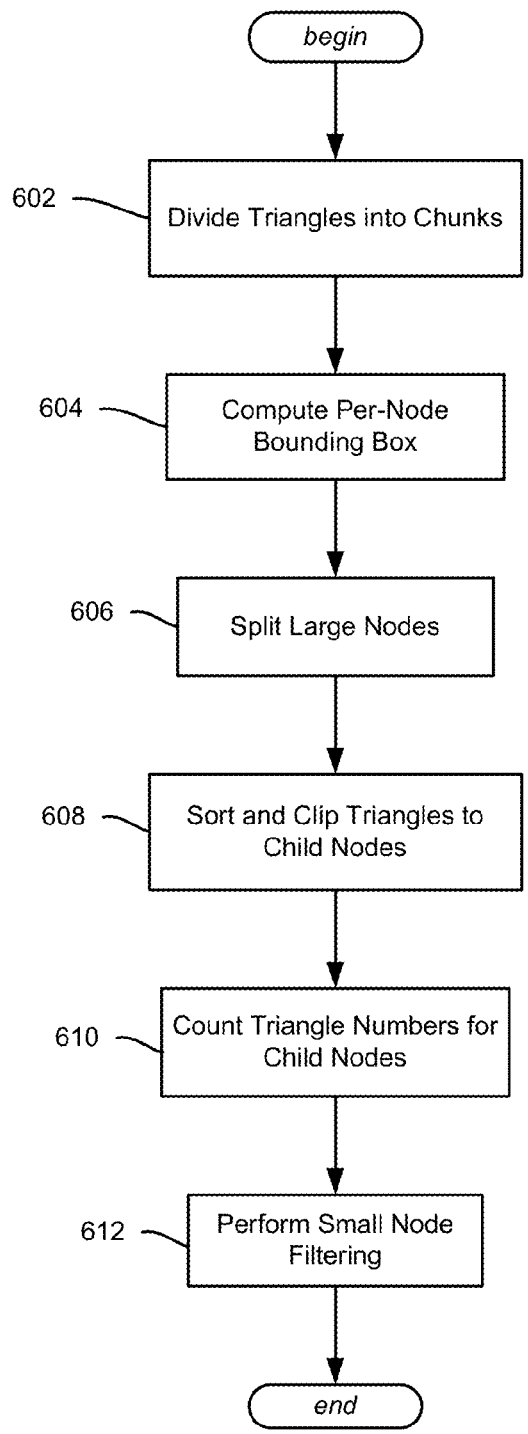
FIG. 6 is a flow diagram representing general steps of an algorithm for large node processing.

One suitable large node processing procedure, PROCESSLARGENODES, is set forth in Algorithm 2 and is also generally represented in FIG. 6:

Algorithm 2, Large Node Stage-PROCESSLARGENODES:

```
procedure PROCESSLARGENODES(
    in activelist:list;
    out smalllist, nextlist:list)
begin
    // divide triangles into chunks
    for each node i in activelist in parallel
        Divide all triangles in node i into fixed size chunks, store
        chunks in chunklist
    // compute per-node bounding box
    for each chunk k in chunklist in parallel
        Compute the bounding box of all triangles in k, using standard
        reduction
    Perform segmented reduction on per-chunk reduction result to
    compute per-node bounding box
    // split large nodes
    for each node i in activelist in parallel
        for each side j of node i
            if i contains more than $C_e$ empty space on
            side j then
                Cut off i's empty space on side j
        Split node i at spatial median of the longest axis
        for each created child node ch
            nextlist.add(ch)
    // sort and clip triangles to child nodes
    for each chunk k in chunklist in parallel
        i ← k.node( )
        for each triangle t in k in parallel
            if t is contained in both children of i then
                $t_0$ ← t
                $t_1$ ← t
                Sort $t_0$ and $t_1$ into two child nodes
                Clip $t_0$ and $t_1$ to their respective owner node
            else
                Sort t into the child node containing it
    // count triangle numbers for child nodes
    for each chunk k in chunklist in parallel
        i ← k.node( )
        Count triangle numbers in i's children, using reduction
    Perform segmented reduction on per-chunk result to compute
    per-child-node triangle number
    // small node filtering
    for each node ch in nextlist in parallel
        if ch is small node then
            smalllist.add(ch)
            nextlist.delete(ch)
end
```

This procedure takes activelist as input, and updates smalllist and nextlist as output. Note that a triangle-node association list is also maintained for each node list. The triangle-node association list stores triangle indices contained in the node list, sorted by node index. Each node in the node list records the index of its first triangle in the triangle-node association list and the triangle number it contains, the scene space it occupies, and the pointers to its child nodes.

FIG. 6 describes the general steps of the above algorithm. A first step (step 602) of the procedure divides the triangles in each node into fixed-sized chunks. In one implementation, the chunk size is set to N=256. A large fraction of the subsequent computations are parallelized over the triangles in these chunks.

In a second step (step 604), the bounding box of the triangles in each node is computed. This is done by first computing the bounding box of the triangle's AABBs in each chunk using a reduction algorithm (described below with respect to Algorithm 3), and then computing the bounding boxes of the nodes by performing segmented reduction in a known manner on the sequence of the chunk reduction results. Segmented reduction performs reduction on arbitrary segments of an input sequence. The result is a sequence in which each element holds the reduction result of one segment.

One suitable GPU algorithm for GPU segmented reduction is described in Algorithm 3:

```
procedure GPUSEGREDUCE(
    in data, owner:list; op: reduction operator;
    out result:list)
begin
    result ← new list
    Fill result with op's identity element
    // assume there are n elements
    for d = 0 to $\log_2 n - 1$
        for each i = 0 to $(n - 1)/2^{d+1}$ in parallel
            $w_0$ ← owner[$2^{d+1}$i]
            $w_1$ ← owner[$2^{d+1}$i + $2^d$]
            if $w_0 \neq w_1$ then
                result[$w_1$] ← op(result[$w_1$], data[$2^{d+1}$i + $2^d$])
            else
                data[$2^{d+1}$i] ← op(data[$2^{d+1}$i], data[$2^{d+1}$i + $2^d$])
    end
```

In the input list data, the data elements belonging to the same segment are located contiguously. In another input list owner, owner[i] indicates the segment index of data[i]. The reduction operator op is associated with an identity value, as listed in the table below:

| Operator | Identity value | Usage |
|---|---|---|
| min | $+\infty$ | compute bounding box |
| max | $-\infty$ | compute bounding box |
| + | 0 | count triangle number |

The algorithm takes a multi-pass approach. Each thread takes two elements. If the two elements have the same owner, they are replaced by their operation result. Otherwise, one element is accumulated into result and the other is retained. Note that the chunk data structure is related to optimal performance. Within each chunk, only unsegmented reduction is performed on the triangles' axis-aligned bounding boxes, significantly reducing the element number in the subsequent segmented reduction. Although it is possible to compute the node bounding boxes by performing segmented reduction on the input triangles' axis-aligned bounding boxes directly, this is inefficient because large segmented reductions are about three times slower than large unsegmented reductions.

In a third step, (step 606), with computed node bounding boxes, large nodes are split in parallel using the splitting scheme described above. Note that a node is repeatedly split using empty space splitting until a spatial median split is reached. This allows reusing the bounding box and avoiding unnecessary computations after empty space splitting.

In a fourth step, (step 608), triangles are sorted and clipped into child nodes. Triangle sorting is essentially list splitting. For each chunk, the triangles in the chunk are first checked to generate a vector of Boolean values, which indicates whether each triangle is in a child node or not. Then the triangles are divided into two groups, with the triangles marked true on the left side of the output vector and the triangles marked false on the right side. This can be easily done using a known split operation. For those triangles contained in both child nodes, another pass is needed to clip them into the nodes. In another step, step 610, the triangle numbers for the child nodes are counted using segmented reduction in a way similar to bounding box computation. The reduction operator used here is "+". To filter small nodes, if the triangle number of a node is less than the threshold T, it is added to smalllist and deleted from nextlist, as generally represented by step 612.

Compared to the large node stage, the small node stage is relatively simple. First, the computation is parallelized over nodes rather than triangles. The workload among small nodes is naturally balanced because the triangle numbers of small nodes do not vary significantly (from 0 to T). Second, unlike in the large node stage, triangles are not clipped when splitting small nodes. Although clipping triangles to owner nodes reduces false positives of the triangle-in-node test and reduces the SAH cost, clipping may also cause undesirable excessive splits because SAH does not take memory costs into account. While clipping is effective for large nodes by preventing false positives from accumulating over future splits, for small nodes, actual experiments indicate that clipping rarely improves ray tracing performance. Thus triangles are not clipped for small nodes, and the splitting plane candidates are restricted to those determined by the faces of the axis-aligned bounding boxes of triangles contained in the initial small nodes.

Figure 7:
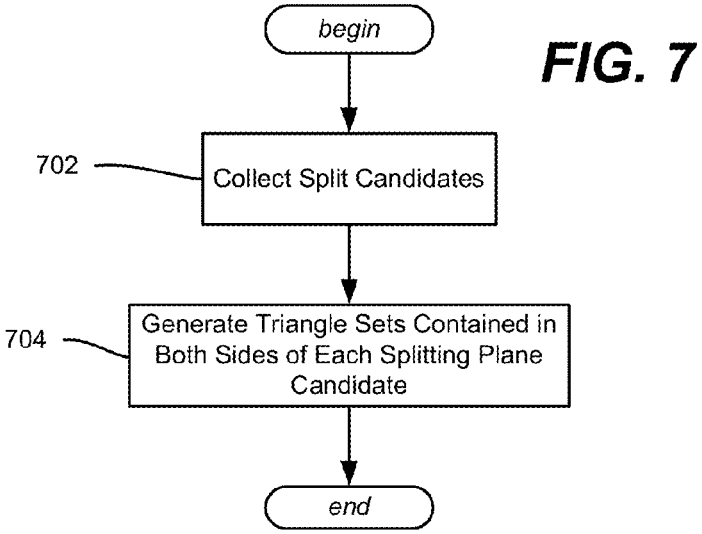
FIG. 7 is a flow diagram representing general steps of an algorithm for small node preprocessing.
Figure 8:
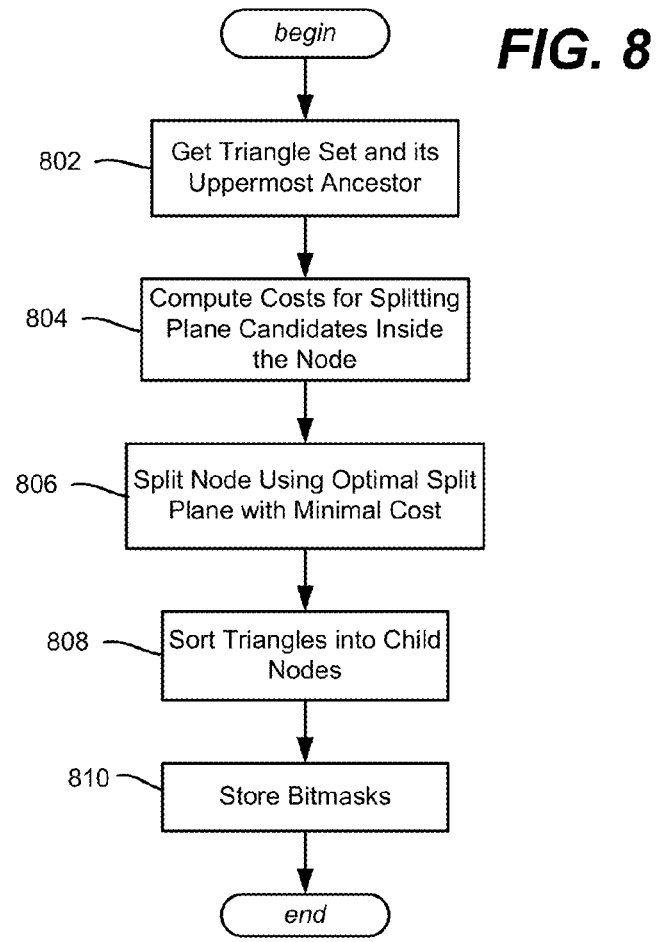
FIG. 8 is a flow diagram representing general steps of an algorithm for small node processing.

As shown in Algorithm 4 and as generally represented in FIGS. 7 and 8, the small node stage comprises two procedures, PREPROCESSSMALLNODES (FIG. 7) and PROCESSSMALLNODES (FIG. 8):

```
procedure PREPROCESSSMALLNODES(smalllist:list:)
begin
    for each node i in smalllist in parallel
        i.splitList ← list of all split candidates in i
        for each split candidate j in i in parallel
            /* "left" represents smaller coordinate */
            j.left ← triangle set on the left of j
            j.right ← triangle set on the right of j
    end
procedure PROCESSSMALLNODES(
        in activelist:list;
        out nextlist:list)
begin
    for each node i in activelist in parallel
        // compute SAH and determine the split plane
        s ← i.triangleSet
        r ← i.smallRoot
        A₀ ← area of node i
        SAH₀ ← || s ||
        for j where j ∈ r.splitList and j.triangle ∈ s
            C_L ← || s ∩ j.left ||
            C_R ← || s ∩ j.right ||
            A_L ← area of left child after split j
            A_R ← area of right child after split j
            SAH_j ← (C_L A_L + C_R A_R)/A₀ + C_ts
        p ← The split candidate that yields minimal SAH
        // split small nodes
```

-continued

```
        if SAH_p ≥ SAH₀ then
            Mark i as leaf node
        else
            Split i using p, add new nodes to nextlist
            Sort triangles to new nodes
    end
```

The first procedure collects the split candidates, as generally represented at step 702 of FIG. 7. As generally represented at step 704, the preprocessing also generates the triangle sets contained in both sides of each splitting plane candidate with a single pass over the triangles in a node.

Figure 9:
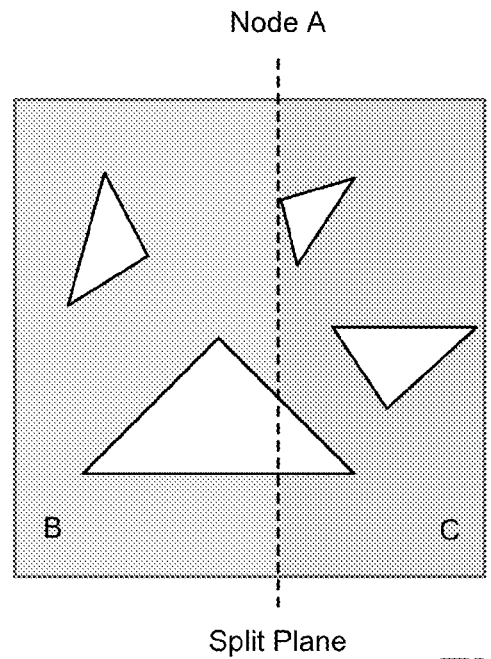
FIGS. 9 and 10 are example representations of storing triangle sets as bitmasks for a small root, including splitting a node (FIG. 9) into subsets of triangles for storing as bitmasks (FIG. 10).
Figure 10:
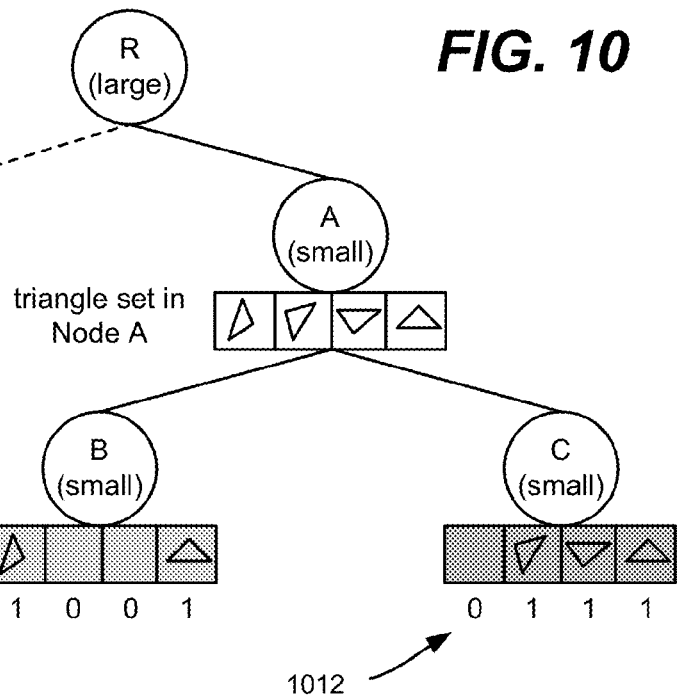

As generally represented in FIG. 8, the second procedure, PROCESSSMALLNODES, splits small nodes. Processed in parallel for each node i, the procedure (at step 802) gets its triangle set, triangleSet, and its uppermost ancestor, smallRoot, (also a small node) in the tree. Then the SAH costs for the splitting plane candidates located inside the node are computed (step 804). At step 806 the node is split using the optimal split plane with minimal cost, and triangles are sorted into child nodes (step 808). Instead of storing the triangle sets in the triangle-node association lists as is done in the large node stage, the triangle sets are stored in small nodes as a bitmask of its smallRoot, (step 810) as shown in FIGS. 9 and 10. Note that the triangle sets of each split candidate j, j.left and j.right, are also stored as bitmasks (e.g., 1010 and 1012). With this bitmask representation, triangle sorting and SAH evaluation for any split candidate can be efficiently done using bitwise operations.

As shown in Algorithm 4, the bitmask of the left child is computed as the bitwise AND of the bit mask of the current node s and the bit mask of the left side of the split candidate j, which is pre-computed in PREPROCESSSMALLNODES. Then a known parallel bit counting routine is performed on the resulting bit mask to get the triangle number of the left child. The bit mask representation allows computing the optimal split plane in O(n) time and sort triangles in O(1) time. An alternative method for computing the optimal splitting plane in O(n) is to sort the split candidates in a preprocess. Then the cost functions of the split candidates and the optimal splitting plane can be computed by only a single pass over the sorted data, at the cost of O(n). However, since the sorted order cannot be represented as a bit mask, triangle sorting can only be done at the cost of O(n).

Figure 11:
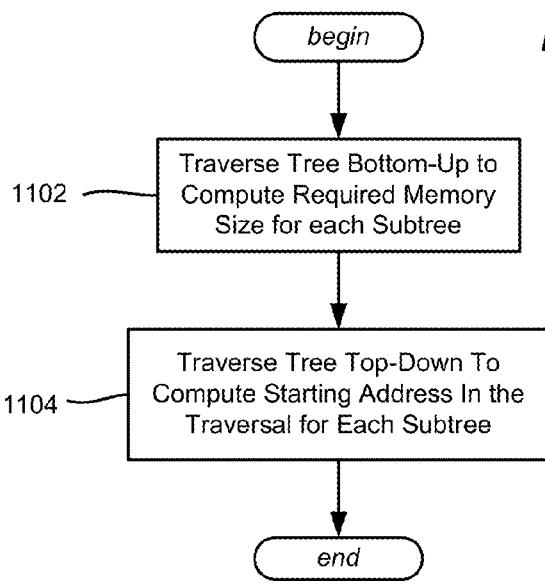
FIG. 11 is a flow diagram representing general steps of a preorder traversal algorithm.

As described in the aforementioned related patent application Ser. No. 12/241,044, one implemented GPU ray tracer is stack-based, requiring the kd-tree's final layout to be a preorder traversal of nodes for optimal cache performance. The preorder traversal is computed using two parallel breadth-first search traversals, e.g., as set forth in Algorithm 5 (PREORDERTRAVERSAL) and as represented in FIG. 11:

```
procedure PREORDERTRAVERSAL(nodelist:list)
begin
    for each tree level l of nodelist from bottom-up
        UPPASS(l)
    Allocate tree using root node's size
    for each tree level l of nodelist from top-down
        DOWNPASS(l)
end
procedure UPPASS(activelist:list)
begin
    for each node i in activelist in parallel
        if i is not a leaf then
            i.size ← i.left.size + i.right.size + 1
        else
```

-continued

```
        i.size ← i.triangleCount + 1
    end
procedure DOWNPASS(activelist:list)
begin
    for each node i in activelist in parallel
        if i is not a leaf then
            i.left.address ← i.address + 1
            i.right.address ← i.address + 1 + i.left.size
        Store node i in final format to i.address
end
```

A first pass (step 1102) traverses the tree bottom-up to compute required memory size for each sub-tree. A second pass (step 1104) traverses the tree top-down to compute the starting address in the traversal for each sub-tree, and distributes node information to the corresponding address to produce the final tree. Note that the PREORDERTRAVERSAL algorithm collects nodes located at the same tree level. Further note that this information is already available in each while-loop in Algorithm 1.

After preorder traversal, each node in the resulting node list records the number and indices of the triangles it contains, its splitting plane, and the links to its children.

The above described kd-tree builder may be adapted for photon mapping. Also described is how to perform a k-nearest neighbor (KNN) search using kd-trees on the GPU, and using the kd-tree builder and KNN search to render caustics.

Algorithm 1 can be used to build photon kd-trees with some straightforward modification. One modification is that VVH is used (voxel volume heuristic (VVH) instead of SAH) to evaluate the split cost function. Given a node d and a split position x, the VVH cost function is defined as:

$$VVH(x) = C_{ts} + \frac{C_L(x)V(d_L(x) \pm R)}{V(d \pm R)} + \frac{C_R(x)V(d_R(x) \pm R)}{V(d \pm R)},$$

where the definitions of $C_{ts}$, $C_L(x)$ and $C_R(x)$ are similar to those in SAH; R is an estimated KNN query radius described in more detail below.

$V(d\pm R)$ represents the volume of node d's cell extended by radius R in the three axis directions; $dL(x)$ and $dR(x)$ are the left and right child nodes, respectively, for the given split position x. For large nodes, the hybrid scheme of spatial median splitting and empty space splitting is still employed. However, a different switch threshold, e.g., $C_e$=ten percent, is used in one implementation. Also, a smaller threshold for large/small node classification, T=32, is used in one implementation, because exact VVH cost evaluation is generally more expensive than SAH cost evaluation.

A second modification is that, unlike in ray tracing, photon kd-trees are built for points instead of triangles. Thus there is no need to compute axis-aligned bounding boxes in the initialization stage, and clipping to split planes is no longer required for large nodes. Splitting planes are restricted to initial point positions for small nodes.

A third modification is that the large node stage may be significantly simplified because clipping is not needed. Most computation can be directly parallelized over the points in large nodes, and the chunk data structure is no longer necessary. In the initialization stage, for each of the three axis dimensions, a sorted order is computed and maintained for the points using a sort primitive (e.g., cudppSort). With the sorted order, tight bounding boxes of large nodes can be computed in O(1) time, avoiding the use of segmented reductions. This compensates for the overhead of computing and maintaining the sorted order. Also sorting points to child nodes and counting point numbers for child nodes can be done in O(n) time with a single pass over the sorted data.

The system stores point sorted order for the nodes in three concatenated point ID lists, one for each axis. To allow efficient per-node access of these lists, two properties are enforced, namely that points in the same node are contiguous in the lists, and points in the same node start at the same offset in three lists. Such properties allow an arbitrary sub-list for each individual node to be indexed using a head pointer and a tail pointer.

After node splitting, a known split operation is performed on the concatenated lists to separate points of left child nodes and points of right child nodes; note that the resulting new lists inherit the two aforementioned properties. The sorted order is also used to accelerate the computation in PREPROCESSSMALLNODES in the small node stage. However, the bitmask representation and bitwise operations for small nodes are still employed for both performance and storage efficiency.

As described above, the nodes are reorganized using a preorder traversal. Each node in the resulting node lists records the number and indices of the photons it contains, its splitting plane, the links to its children, and its bounding box.

To estimate the radiance at a surface point, the k-nearest photons are located and filtered, which needs to be efficient for good performance of photon mapping. The photon kd-tree built above can be used to speed up nearest neighbor queries. One way to locate the nearest neighbors in a kd-tree is to use a known priority queue method. Although it is possible to implement a priority queue using CUDA's thread local memory, such an implementation is inefficient because CUDA's local memory requires both pipelining with sufficient amount of independent arithmetic for efficient latency hiding and a thread-wise coherent access pattern. In priority queue operations, the memory accesses and arithmetic are generally interdependent; it is difficult for the hardware to hide memory latency. Thread-wise coherence is also problematic since photon distribution is usually highly irregular.

Figure 12:
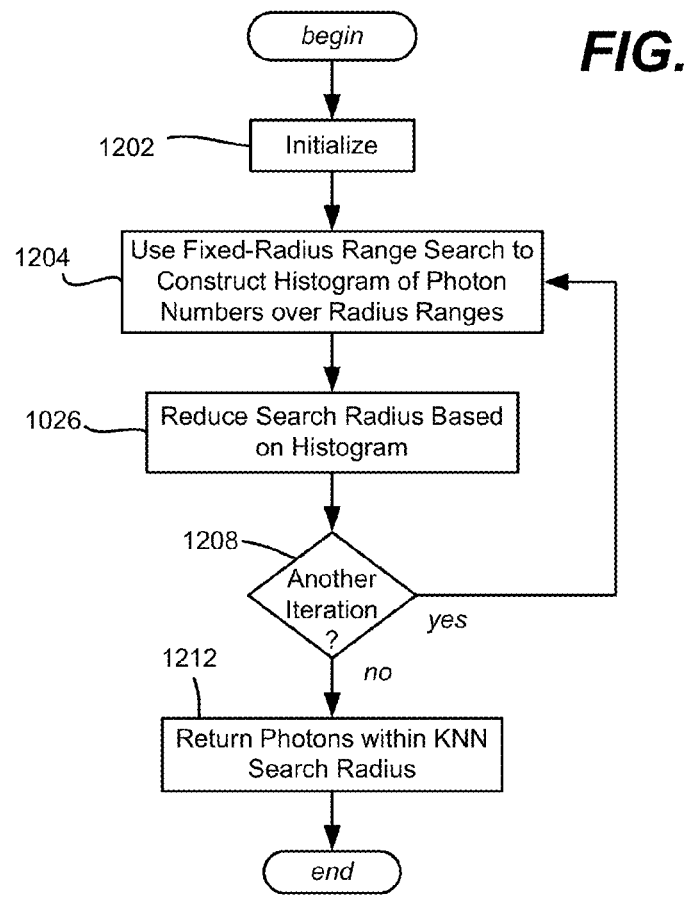
FIG. 12 is a flow diagram representing general steps of an iterative KNN-search algorithm for locating photons to estimate their radiance for photon mapping.

Thus, described is an iterative KNN-search algorithm based on known range searching, (Algorithm 6), as also represented in FIG. 12:

```
function KNNSEARCH(in q:point)
begin
    r_min ← 0
    r_max ← r_0
    hist ← new array[0..n_hist – 1]
    for i = 1 to n_iter
        r ← r_max
        Δ_r ← r_max – r_min
        Set all elements in hist to zero
        for each photon p, ||p – q||< r, via range search
```

$$\text{Increment hist}\left[\left\lfloor \frac{\max\{\|p - q\| - r_{\min}, 0\}}{\Delta_r} n_{\text{hist}} \right\rfloor\right]$$

```
        Find j, such that hist[j] <k ≤ hist[j + 1]
```

$$(r_{\min}, r_{\max}) \leftarrow \left(r_{\min} + \frac{i}{n_{\text{hist}}}\Delta_r, r_{\min} + \frac{i+1}{n_{\text{hist}}}\Delta_r\right)$$

```
    r_k ← r_max
    return all photons p, ||p – q||< r_k, via range search
end
```

As shown in Algorithm 6 and FIG. 12, the algorithm starts (step 1202) from an initial conservative search radius $r_0$, and tries to find the KNN query radius $r_k$ through a few iterations.

During each iteration (step 1208), at step 1204 a fixed-radius range search is performed to construct hist, a histogram of photon numbers over radius ranges. Via step 1206, the search radius is then reduced according to the histogram. Following the iterations, at step 1212, the photons within radius $r_k$ are returned.

As can be seen, there are three parameters in Algorithm 6, namely $r_0$, $n_{hist}$ and $n_{iter}$. The parameter $r_0$ is an initial search radius. On the one hand, $r_0$ needs to be conservative such that there are at least k photons within this radius; conversely it needs to be as tight as possible to limit the search range. A good estimation of $r_0$ affects the performance of the KNN search.

More particularly, due to the irregularity of photon distributions, $r_0$ needs to be estimated for each KNN query point. As shown in Algorithm 7, a two-stage approach is used:

```
procedure PRECOMPUTERADIUS( )
begin
   Compute R
   Initialize R_i to +∞, for all nodes i
   work ← new list
   for each kd-tree node i with radius less than α · R
      work.add(i)
   for each node i in work
      if i.parent is in work then
         work.remove(i)
   for i=1 to n_level
      for each node i in work
         Compute KNN query radius R_i for node i's center C_i
      work' ← new list
      for each node i in work
         Add i's children to work'
      work ← work'
end
function ESTIMATERADIUS(in p:point)
begin
   r ← R
   for each node i containing p
      r ← min{r, || p − C_i || + R_i}
   return r
end
```

For each rendering frame, PRECOMPUTERADIUS is carried out to compute KNN query radiuses for a set of node centers. This is done by running the KNN search algorithm in Algorithm 6 with parameter $r_0$=R. Then, for each KNN query point p, ESTIMATERADIUS is performed to compute p's initial query radius from the KNN query radiuses of the nodes containing p. The resulting query radius is conservative; R is a conservative estimation for $r_0$. Note that photon density ρ is inversely proportional to the square of KNN query radius $r_k$. By defining a minimal physically meaningful density $ρ_ε$, a reasonably good estimation can be computed from $$R \sim \sqrt{\frac{1}{ρ_ε}}.$$

R is also used as the estimated query radius in VVH.

$C_i$ is the center of node i's bounding box. The node radius is computed as half of the length of the bounding box diagonal. Two user-specified constants are α and $n_{level}$, which determine the nodes used for radius estimation; α=0.5 and $n_{level}$=3 work well in one implementation.

The parameter $n_{hist}$ is the size of the histogram array. It controls the precision gain in each iteration. As hist requires frequent random updates, it is stored in CUDA's shared memory. A larger $n_{hist}$ increases the precision of each iteration while decreasing GPU occupancy; an $n_{hist}$ value of 32 is a reasonable balance point. The parameter $n_{iter}$ is the number of iterations, which in one implementation is two; (the resulting error in the final KNN radius is less than 0.1 percent).

Range searching is performed using a standard DFS kd-tree traversal algorithm. As with stack-based kd-tree traversal in GPU ray tracing, this algorithm can be efficiently implemented using CUDA's local memory.

Figure 13:
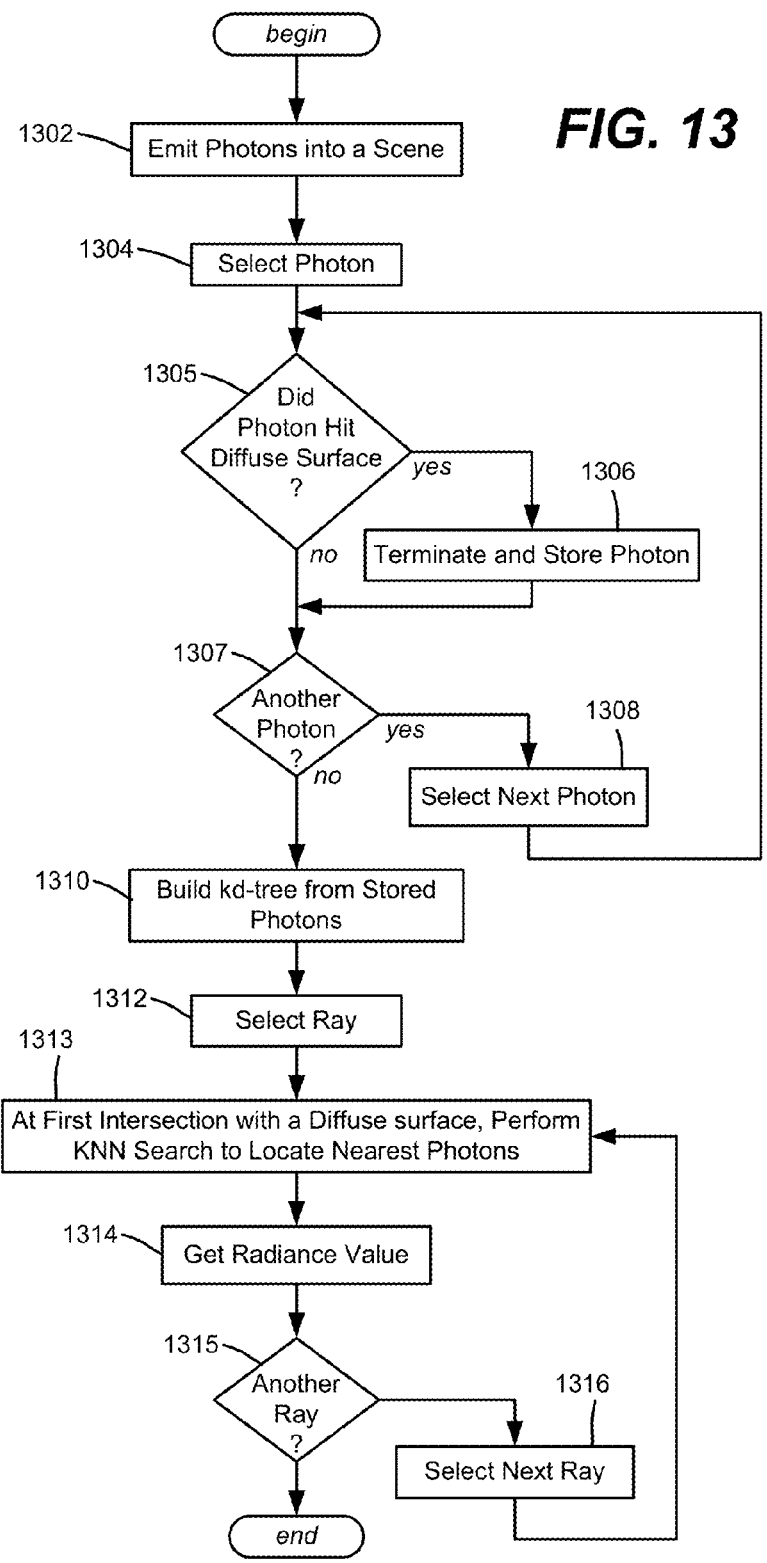
FIG. 13 is a flow diagram representing general steps taken by a photon mapping mechanism for rendering realistic caustics.

Turning to caustic rendering of dynamic scenes, a photon mapping system for rendering realistic caustics on the GPU has been implemented as generally represented in the example steps of FIG. 13. At step 302, before building the kd-tree tree, photons are emitted into the scene note that the process of tracing eye rays and tracing photons from a light source is very similar; the GPU ray tracer described in the aforementioned related patent application (MS 323434.01) can be easily adapted for photon tracing. A main difference is that the interaction of a photon with a surface material is different from that of a ray. When a photon hits a surface, it can either be reflected, transmitted, or absorbed based on the surface material. Because only caustic photons are traced, a photon is terminated and stored (step 1306) once it hits a diffuse surface, as generally represented by steps 1304-1308.

One example implementation supports only point light sources, in which photons are emitted randomly using a projection map. For caustic rendering, only specular and refractive objects are identified in the projection map. Once photon tracing is done, a kd-tree is built for the stored photons as generally represented by step 1310. Caustics are then rendered by tracing eye rays. As generally represented by steps 1312-1316, for each ray, at its first intersection with a diffuse surface, a KNN search is performed to locate the nearest photons (step 1313), which are then filtered to get the radiance value (step 1314).

Exemplary Operating Environment

Figure 14:
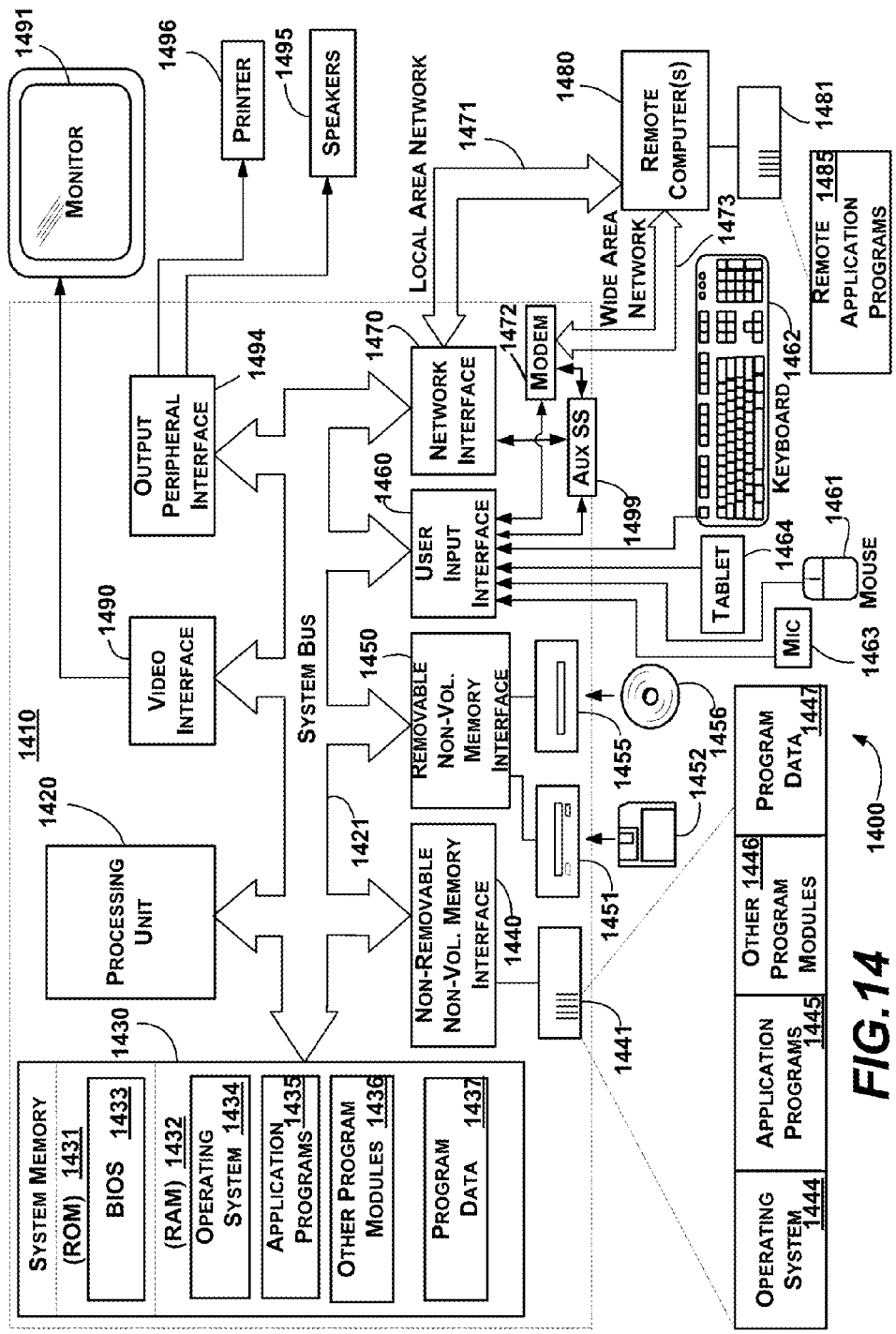
FIG. 14 shows an illustrative example of a computing environment into which various aspects of the present invention may be incorporated.

FIG. 14 illustrates an example of a suitable computing and networking environment 1400 on which the examples of FIGS. 1-13 may be implemented. The computing system environment 1400 is only one example of a suitable computing environment and is not intended to suggest any limitation as to the scope of use or functionality of the invention. Neither should the computing environment 1400 be interpreted as having any dependency or requirement relating to any one or combination of components illustrated in the exemplary operating environment 1400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 14, an exemplary system for implementing various aspects of the invention may include a general purpose computing device in the form of a computer 1410. Components of the computer 1410 may include, but are not limited to, a processing unit 1420, a system memory 1430, and a system bus 1421 that couples various system components including the system memory to the processing unit 1420. The system bus 1421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1410 typically includes a variety of computer-readable media. Computer-readable media can be any available media that can be accessed by the computer 1410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 1430 includes computer storage media in the form of volatile and/or nonvolatile memory such as read only memory (ROM) 1431 and random access memory (RAM) 1432. A basic input/output system 1433 (BIOS), containing the basic routines that help to transfer information between elements within computer 1410, such as during start-up, is typically stored in ROM 1431. RAM 1432 typically contains data and/or program modules that are immediately accessible to and/or presently being operated on by processing unit 1420. By way of example, and not limitation, FIG. 14 illustrates operating system 1434, application programs 1435, other program modules 1436 and program data 1437.

The computer 1410 may also include other removable/non-removable, volatile/nonvolatile computer storage media. By way of example only, FIG. 14 illustrates a hard disk drive 1441 that reads from or writes to non-removable, nonvolatile magnetic media, a magnetic disk drive 1451 that reads from or writes to a removable, nonvolatile magnetic disk 1452, and an optical disk drive 1455 that reads from or writes to a removable, nonvolatile optical disk 1456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1441 is typically connected to the system bus 1421 through a non-removable memory interface such as interface 1440, and magnetic disk drive 1451 and optical disk drive 1455 are typically connected to the system bus 1421 by a removable memory interface, such as interface 1450.

The drives and their associated computer storage media, described above and illustrated in FIG. 14, provide storage of computer-readable instructions, data structures, program modules and other data for the computer 1410. In FIG. 14, for example, hard disk drive 1441 is illustrated as storing operating system 1444, application programs 1445, other program modules 1446 and program data 1447. Note that these components can either be the same as or different from operating system 1434, application programs 1435, other program modules 1436, and program data 1437. Operating system 1444, application programs 1445, other program modules 1446, and program data 1447 are given different numbers herein to illustrate that, at a minimum, they are different copies. A user may enter commands and information into the computer 1410 through input devices such as a tablet, or electronic digitizer, 1464, a microphone 1463, a keyboard 1462 and pointing device 1461, commonly referred to as mouse, trackball or touch pad. Other input devices not shown in FIG. 14 may include a joystick, game pad, satellite dish, scanner, or the like. These and other input devices are often connected to the processing unit 1420 through a user input interface 1460 that is coupled to the system bus, but may be connected by other interface and bus structures, such as a parallel port, game port or a universal serial bus (USB). A monitor 1491 or other type of display device is also connected to the system bus 1421 via an interface, such as a video interface 1490. The monitor 1491 may also be integrated with a touch-screen panel or the like. Note that the monitor and/or touch screen panel can be physically coupled to a housing in which the computing device 1410 is incorporated, such as in a tablet-type personal computer. In addition, computers such as the computing device 1410 may also include other peripheral output devices such as speakers 1495 and printer 1496, which may be connected through an output peripheral interface 1494 or the like.

The computer 1410 may operate in a networked environment using logical connections to one or more remote computers, such as a remote computer 1480. The remote computer 1480 may be a personal computer, a server, a router, a network PC, a peer device or other common network node, and typically includes many or the of the elements described above relative to the computer 1410, although only a memory storage device 1481 has been illustrated in FIG. 14. The logical connections depicted in FIG. 14 include one or more local area networks (LAN) 1471 and one or more wide area networks (WAN) 1473, but may also include other networks. Such networking environments are commonplace in offices, enterprise-wide computer networks, intranets and the Internet.

When used in a LAN networking environment, the computer 1410 is connected to the LAN 1471 through a network interface or adapter 1470. When used in a WAN networking environment, the computer 1410 typically includes a modem 1472 or other means for establishing communications over the WAN 1473, such as the Internet. The modem 1472, which may be internal or external, may be connected to the system bus 1421 via the user input interface 1460 or other appropriate mechanism. A wireless networking component 1474 such as comprising an interface and antenna may be coupled through a suitable device such as an access point or peer computer to a WAN or LAN. In a networked environment, program modules depicted relative to the computer 1410, or portions thereof, may be stored in the remote memory storage device. By way of example, and not limitation, FIG. 14 illustrates remote application programs 1485 as residing on memory device 1481. It may be appreciated that the network connections shown are exemplary and other means of establishing a communications link between the computers may be used.

An auxiliary subsystem 1499 (e.g., for auxiliary display of content) may be connected via the user interface 1460 to allow data such as program content, system status and event notifications to be provided to the user, even if the main portions of the computer system are in a low power state. The auxiliary subsystem 1499 may be connected to the modem 1472 and/or network interface 1470 to allow communication between these systems while the main processing unit 1420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover the modifications, alternative constructions, and equivalents falling within the spirit and scope of the invention.

What is claimed is:

1. In a computing environment, a method comprising:
building a kd-tree representative of scene geometry via graphics processing unit (GPU)-based parallel processing, wherein building the kd-tree comprises storing data representative of the photons in the kd-tree, and wherein small nodes and large nodes of the kd-tree nodes are built in breadth-first search order in which the small nodes are defined by a threshold corresponding to a number of geometric primitives;
using the kd-tree for photon mapping to produce a frame of a dynamic scene, wherein using the kd-tree for photon mapping comprises estimating a radiance value at a surface point by locating a set of nearby photons, and wherein locating the set of nearby photons comprises performing a k-nearest neighbor search;
emitting and tracing a set of photons into a scene;
determining a search radius by constructing a histogram via a fixed-radius range search;
reducing the search radius based upon the histogram; and
iteratively repeating the constructing and reducing operations until an iteration number is met.

2. The method of claim 1 wherein building the kd-tree comprises, differentiating large nodes from small nodes based on geometry primitives associated with each node, splitting large nodes into child nodes by empty space splitting and spatial splitting, and splitting small nodes into child nodes based on computed costs for split candidates.

3. The method of claim 2 wherein differentiating large nodes from small nodes comprises evaluating a number of points in a node relative to the threshold.

4. The method of claim 1 wherein building the kd-tree comprises storing data representative of caustic photons in the kd-tree, including by terminating and storing data for each photon that hits a diffuse surface.

5. The method of claim 1 wherein locating the set of nearby photons comprises returning a count of the photons within the search radius.

6. In a computing environment having a graphics processing unit (GPU), a system comprising:
a kd-tree building mechanism coupled to the GPU, and
a photon mapping mechanism coupled to the kd-tree building mechanism configured to:
build a kd-tree representative of scene geometry completely in breadth-first order,
split at least some nodes of the kd-tree into child nodes based on computed costs for split candidates via a voxel volume heuristic, and
traverse the kd-tree to determine photon-related data to produce a frame of a dynamic scene,
emit a set of photons into a scene,
trace the photons, and
estimate a radiance value at a surface point by locating a set of nearby photons by performing a k-nearest neighbor search,
determine a search radius for the k-nearest neighbor search by constructing a histogram via a fixed-radius range search,
reduce the search radius based upon the histogram, and
iteratively repeat the constructing and reducing operations until an iteration number is met.

7. The system of claim 6 wherein the photon mapping mechanism and kd-tree building mechanism are configured to build a new kd-tree for each frame of a set of subsequent frames.

8. The system of claim 6 wherein the kd-tree building mechanism is configured to differentiate large nodes from small nodes based on geometry primitives associated with each node, and to split small nodes into child nodes based on the computed costs for split candidates via the voxel volume heuristic.

9. The system of claim 6 wherein a size of the histogram and the iteration number are received as parameters by the photon mapping mechanism.

10. The system of claim 6 wherein the photon mapping mechanism is configured to emit a set of photons into a scene, traces only caustic photons, and is configured to estimate a radiance value at a surface point by locating a set of nearby caustic photons.

11. An article comprising one or more computer-readable storage devices having computer-executable instructions stored thereon, which in response to execution by a computer, cause the computer to perform steps, comprising:
tracing and mapping photons via a graphics processing unit (GPU), using the GPU to construct small and large nodes of a kd-tree representative of the traced photons in breadth-first search order in which the small nodes are differentiated from the large nodes based upon a number of points associated with each node, and
using the GPU to estimate radiance for a point by using a k-nearest neighbor search to determine a number of photons within a radius of that point, wherein a search-radius for the k-nearest neighbor search is determined by:
constructing a histogram via a fixed-radius range search, reducing the search radius based upon the histogram, and iteratively repeating the constructing and reducing operations until an iteration number is met.

12. The article of claim 11 wherein tracing and mapping the photons comprises tracing only caustic photons based upon whether each photon hits a diffuse surface.

* * * * *